United States Patent [19]

Husse et al.

[11] 4,014,210
[45] Mar. 29, 1977

[54] DEVICE FOR USE IN THE ULTRASONIC MEASUREMENT OF MASS FLOW OF GAS

[75] Inventors: Massimo Husse; Mauro Lagonigro, both of Turin, Italy

[73] Assignee: Fiat Societa per Azioni, Turin, Italy

[22] Filed: Apr. 8, 1976

[21] Appl. No.: 675,017

[30] Foreign Application Priority Data

Apr. 30, 1975 Italy .................................. 68095/75

[52] U.S. Cl. .............................................. 73/194 A
[51] Int. Cl.² ............................................ G01F 1/66
[58] Field of Search ........................... 73/24, 194 A

[56] References Cited
UNITED STATES PATENTS 3,468,157  9/1969  Burk et al. .............................. 73/24
3,817,098  6/1974  Brown .............................. 73/194 A Primary Examiner—Richard C. Queisser
Assistant Examiner—John P. Beauchamp
Attorney, Agent, or Firm—Sughrue, Rothwell, Mion, Zinn & Macpeak

[57] ABSTRACT

In a device for measuring ultrasonically the flow of gas, for example the air flow in the induction duct of an internal combustion engine, an upstream piezo-electric transducer is located in a plenum chamber upstream of a measurement duct and a downstream piezoelectric transducer is located in a seating in the measurement duct. To reduce vorticity in the gas flow the upstream transducer is seated at the apex of a frusto-conical element in the inlet chamber and the seating of the downstream transducer is tapered externally.

3 Claims, 1 Drawing Figure

U.S. Patent
Mar. 29, 1977
4,014,210
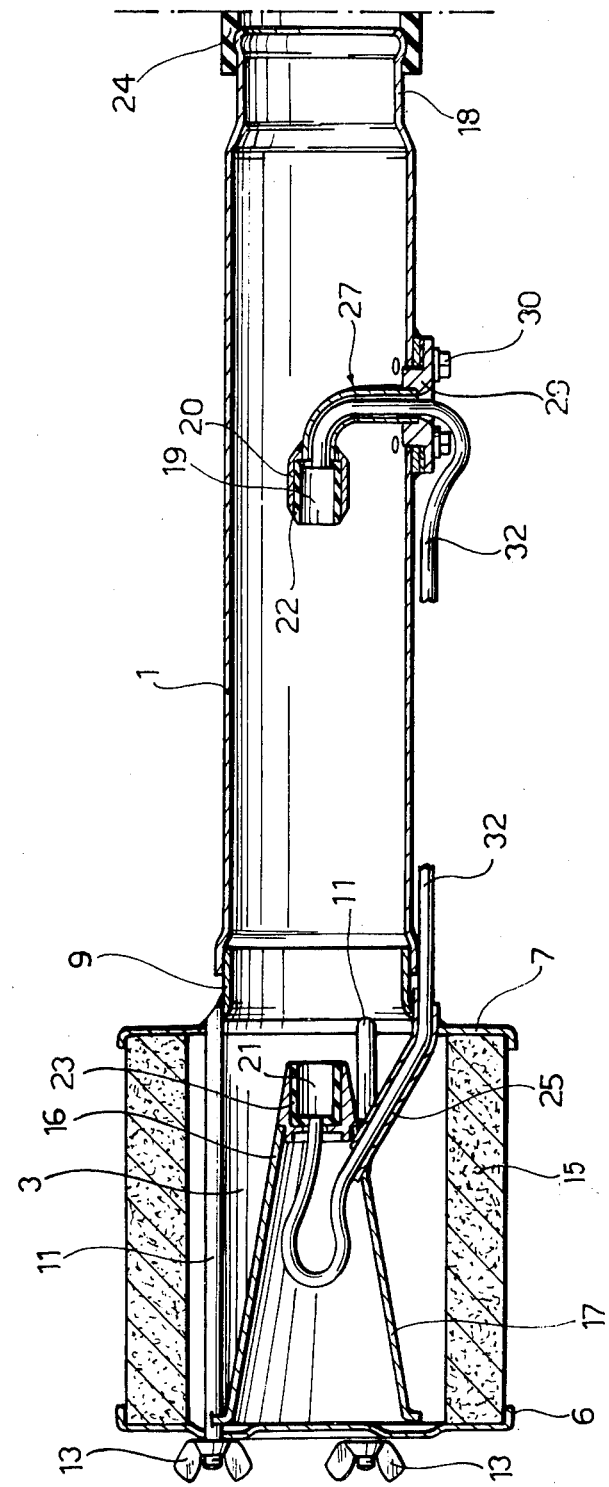

DEVICE FOR USE IN THE ULTRASONIC MEASUREMENT OF MASS FLOW OF GAS

The present invention relates to devices for use in the ultrasonic measurement of mass flow of air or of gas in general, particularly the air flow into the induction duct of an internal combustion engine, of the type consisting of two piezoelectric transducers, situated near the opposite ends of a measurement duct, for connection to an electronic circuit which processes the electrical signals from the two transducers in order to measure the rate of gas flow through the duct.

Devices of this type are known, for example from the Applicants U.S. Pat. application Ser. No. 579,285, now Pat. No. 3,964,309, in which the two transducers are mounted in two plenum chambers for the purpose of avoiding eddy flow in the measurement duct, the upstream chamber near the inlet end of the duct being defined peripherally by an annular filter through which the gas flows radially into the inlet of the measurement duct.

Devices of this type have the disadvantage that in use a considerable delay occurs in the response of the device on account of the presence of the downstream chamber, so that a sudden depression downstream of the device, resulting, for example, from opening the throttle valve of the engine, will result in a perceptible response only after emptying of the said downstream chamber. Moreover the structure of the upstream chamber is such as also to induce vortices at maximum flow rates with resultant errors in the flow measurement, such vortices increasing perceptibly when the device has a downstream chamber.

The object of the present invention is to avoid the aforesaid disadvantages by providing a device for measuring the mass flow of air, or of gas generally, which will allow flow measurement without delay at all operating speeds of an engine and without giving rise to vorticity even at high flow speeds.

According to the present invention there is provided a device for the ultrasonic measurement of the mass flow of gas, for example the mass flow of air in the induction duct of an internal combustion engine, comprising a measurement duct, adjacent the ends of which there are situated upstream and downstream piezoelectric ultrasonic transducers respectively which in use of the device are connected to an electronic circuit for processing the signals of the transducers to derive a measurement of the mass flow of gas, a plenum chamber situated at the inlet end of the measurement duct and surrounding a frusto-conical element the vertex of which faces towards the measurement duct, and a seating for the upstream transducer mounted at the vertex of said frusto-conical element, the downstream transducer being mounted in a seating having a tapered end facing the inlet end of the said measuring duct.

The invention will be further described, by way of non-limiting example, with reference to the attached drawing, which shows in diagrammatic axial section a device according to one embodiment of the invention, which is especially suited for the measurement of the mass flow of air entering the induction duct of an internal combustion engine.

The illustrated device includes a measurement duct 1 in which measurement of the mass air flow entering the induction duct of an engine is effected. At the inlet end of the duct 1 there is situated a plenum chamber 3, defined between a transverse disc-like wall 6 and an annular transverse wall 7. A hollow cylindrical air filter 15 is interposed between the two walls 6, 7 and in the illustrated embodiment the filter 15 is a standard air filter of the kind to be found in most internal combustion engines. The two walls 6, 7 are clamped together by three screw-threaded tie bolts 11, arranged around the periphery of the wall 6 at 120° to each other, one of which tie bolts 11 is shown wholly, and another partially, in the drawing, cooperating with respective wing nuts 13. The annular wall 7 is formed with a central sleeve portion 9 which fits into the inlet end of the duct 1.

Welded on to the tie bolts 11 there is a frusto-conical element 16, disposed within the air filter 15, the wall of the element 16 being covered externally with a layer 17 of acoustically insulating material.

At the outlet end of the duct 1 there is a narrow portion 18 to which a rubber hose 24 is fitted in use of the device, the hose 24 being secured to the narrow portion 18 by means of metal clamps (not shown). The hose 24 connects the duct 1 to the induction duct of the engine (not shown).

Two piezoelectric transducers 19 and 21, are arranged coaxially in the device, the downstream transducer 19 being mounted within the measurement duct 1 in a hollow seating 20, open towards the inlet end of the duct 1, with the interposition of a sheath 22 of rubber or other elastic material. The seating 20 is tapered externally towards the inlet end of the duct 1. The upstream transducer 21 is mounted in a seating facing towards the duct 1, at the narrow end of the frusto-conical element 16, with the interposition of a sheath 23 of rubber or other elastic material.

The frusto-conical element 16 and the hollow seating 20 are supported by respective supports 25 and 27, the support 27 being fixed to the duct 1 by means of a flange 29 through which fixing bolts 30 pass to secure the flange 29 to the wall of the duct 1. The supports 25 and 27 are hollow to afford conduits for the cables 32 connecting the transducers 19, 21 to an electronic circuit (not shown), for processing the electrical output signals from the transducers.

In use of the device air flows radially inwardly through the filter 15 and flows substantially without vortices through the chamber 3, by virtue of the presence of the frusto-conical element 16 which guides the air flow. Such vortex-free flow occurs for all values of air speed through the device and allows use of the device even with very high flows, without vorticity occuring.

The two transducers 19, 21 contained within streamlined seatings do not significantly disturb the air movement through the device and therefore do not produce vortices, not even local ones, which might disturb the flow measurement by the device.

It will be understood that practical embodiments of the invention can vary widely in construction with respect to what has been described and illustrated, without nevertheless departing from the scope of this invention.

We claim:

1. Device for the ultrasonic measurement of the flow of gas, particularly the rate of flow of air in the induction duct of an internal combustion engine, of the type comprising a measurement duct, and respective upstream and downstream piezoelectric ultrasonic transducers mounted adjacent the ends of said measurement duct adapted to provide signals for measuring flow rate, wherein the improvement consists in:
- means defining a plenum chamber situated at the inlet end of the measurement duct;
- a frusto-conical element within said chamber, the vertex of which element faces towards said measurement duct,
- an upstream seating supporting the upstream transducer at the said vertex of said frusto-conical element, and
- a downstream seating supporting said downstream transducer, said downstream seating having a tapered end facing the inlet end of the said measuring duct.

2. The device defined in claim 1, wherein the said frusto-conical element is covered with acoustically insulating material.

3. The device defined in claim 1, including a sheath of elastic material interposed between each of the transducers and its respective seating.

* * * * *